(12) United States Patent
Sun et al.

(10) Patent No.: US 12,463,964 B2
(45) Date of Patent: Nov. 4, 2025

(54) METHOD FOR TRANSMITTING MESSAGE APPLIED TO PRESET SERVER AND TERMINAL, AND ELECTRONIC DEVICE

(71) Applicant: Beijing Youzhuju Network Technology Co., Ltd., Beijing (CN)

(72) Inventors: Yixing Sun, Beijing (CN); Jian Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/900,142

(22) Filed: Sep. 27, 2024

(65) Prior Publication Data

US 2025/0023866 A1 Jan. 16, 2025

Related U.S. Application Data

(63) Continuation of application No. PCT/CN2023/082351, filed on Mar. 17, 2023.

(30) Foreign Application Priority Data

Mar. 29, 2022 (CN) .......................... 202210324115.0

(51) Int. Cl.
*H04L 9/40* (2022.01)

(52) U.S. Cl.
CPC .......... *H04L 63/083* (2013.01); *H04L 63/062* (2013.01)

(58) Field of Classification Search
CPC ... H04L 63/083; H04L 63/062; H04L 9/3226; H04L 9/0819; H04W 12/069
See application file for complete search history.

(56) References Cited

U.S. PATENT DOCUMENTS

2009/0327735 A1* 12/2009 Feng .................... H04L 9/3247
713/180
2017/0006128 A1* 1/2017 Graham-Cumming ....................
H04L 67/14
(Continued)

FOREIGN PATENT DOCUMENTS

CN  103795690 A  5/2014
CN  109462568 A  3/2019
(Continued)

OTHER PUBLICATIONS

Shi Danian et al., CN 103795690, CN Machine Translation, pp. 1-13, May 4, 2014. (Year: 2014).*
(Continued)

*Primary Examiner* — Luu T Pham
*Assistant Examiner* — Canh Le

(57) ABSTRACT

A method for transmitting a message applied to a preset server, a method for transmitting a message applied to a terminal, and an electronic device are provided. The method for transmitting the message applied to the preset server includes: receiving a cloud service access request message transmitted by a terminal, wherein the cloud service access request message includes domain name address information of the preset server; determining a cloud service interface address to be accessed according to the cloud service access request message; performing signature verification on the cloud service access request message according to the cloud service interface address, and re-signing the cloud service access request message in case that the verification has passed, to obtain a new cloud service access request message; and transmitting the new cloud service access request message to the cloud server according to the cloud service interface address.

9 Claims, 9 Drawing Sheets

(56) References Cited

U.S. PATENT DOCUMENTS

| | | | |
|---|---|---|---|
| 2017/0149760 A1* | 5/2017 | Ryan | G06F 21/36 |
| 2018/0295134 A1 | 10/2018 | Gupta et al. | |
| 2019/0306138 A1 | 10/2019 | Carru et al. | |
| 2021/0109992 A1* | 4/2021 | Rappaport | H04L 63/0281 |
| 2021/0226967 A1* | 7/2021 | Shin | H04L 63/02 |
| 2023/0099967 A1* | 3/2023 | Stalioraitis | H04L 67/52 |
| | | | 709/223 |

FOREIGN PATENT DOCUMENTS

| | | |
|---|---|---|
| CN | 112073400 A | 12/2020 |
| CN | 112272158 A | 1/2021 |
| CN | 110661831 B | 11/2021 |
| CN | 113630479 A | 11/2021 |
| CN | 114117532 A | 3/2022 |
| CN | 114640533 A | 6/2022 |
| CN | 114640533 B | 11/2023 |
| EP | 3253023 A1 | 12/2017 |
| WO | 2014/067080 A1 | 5/2014 |
| WO | 2019/127973 A1 | 7/2019 |
| WO | 2021/126321 A1 | 6/2021 |

OTHER PUBLICATIONS

Latifa Khalid et al. "A Novel Cloud Authentication Framework," 2020, pp. 1-7. (Year: 2020).*

Saurabh Dey et al., "Message Digest as Authentication Entity for Mobile Cloud Computing," 2012, pp. 1-6. (Year: 2013).*

International Search Report received for PCT Patent Application No. PCT/CN2023/082351, mailed on May 23, 2023, 10 pages (2 pages of English Translation and 8 pages of Original Document).

Notice of registration procedures received from Chinese patent application No. 202210324115.0 mailed on Oct. 23, 2024, 6 pages (2 pages English Translation and 4 pages Original Copy).

Office action received from Chinese patent application No. 202210324115.0 mailed on Jul. 19, 2023, 14 pages (6 pages English Translation and 8 pages Original Copy).

Communication pursuant to Rules 70(2) and 70a(2) EPC for European Application No. 23777888.1, mailed May 8, 2025, 1 page.

Extended European Search Report for European Application No. 23777888.1, mailed Apr. 16, 2025, 11 pages.

* cited by examiner

Each of users needs to configure an account for each of vendors

METHOD FOR TRANSMITTING MESSAGE APPLIED TO PRESET SERVER AND TERMINAL, AND ELECTRONIC DEVICE

CROSS-REFERENCE TO RELATED APPLICATION

The present disclosure is a continuation of International Patent Application No. PCT/CN2023/082351, filed on Mar. 17, 2023, which claims the priority of Chinese patent application No. 202210324115.0 titled "METHOD, APPARATUS, STORAGE MEDIUM AND ELECTRONIC DEVICE FOR TRANSMITTING A MESSAGE" filed in Chinese Patent Office on Mar. 29, 2022, the entirety of which is incorporated into the present disclosure by reference.

TECHNICAL FIELD

The present disclosure relates to the field of cloud service access, and in particular to a method, apparatus, storage medium and electronic device for transmitting a message.

BACKGROUND

Cloud service vendors provide a series of service capabilities, and developers can use and manage such capabilities through application programming interfaces (APIs) provided by the vendors. In the course of calling an API, it is required to use an interface access key provided by the vendors to sign an issued business request, and the signing algorithm is usually open. The user can sign the business request as long as he/she acquires the key for the account, realizing the calling of the interfaces of related functions.

In practical application scenarios, when multiple users are using a same cloud service, in order to control permissions of resources, multiple accounts with different permissions are generally configured independently, and each of the accounts accesses the resources it needs. However, since it is the interface of the cloud service vendor the user directly accesses, the administration department cannot audit and detect cloud service access requests from respective users, leading to a problem of security risks present in cloud service data access.

SUMMARY

This section is provided to introduce concepts in a brief form, which will be described in detail in the detailed description section later. The content of this section is not intended to identify the key or essential features of the claimed technical solutions, nor is it intended to limit the scope of the claimed technical solutions.

In an aspect, the present disclosure provides a method for transmitting a message, the method being applied to a preset server which is a pre-deployed server for transmitting a message between a terminal and a cloud server, the method comprising:
receiving a cloud service access request message transmitted by the terminal, wherein the cloud service access request message includes domain name address information of the preset server;
determining a cloud service interface address to be accessed according to the cloud service access request message;
performing signature verification on the cloud service access request message according to the cloud service interface address, and re-signing the cloud service access request message in case that the verification has passed, to obtain a new cloud service access request message; and
transmitting the new cloud service access request message to the cloud server according to the cloud service interface address.

In an aspect, the present disclosure provides a method for transmitting a message, the method being applied to a terminal, and the method comprising:
acquiring user identification information of a current user, business request data and an access key pre-allocated for the current user by a preset server, wherein the preset server is a pre-deployed server for transmitting a message between the terminal and a cloud server;
generating a cloud service access request message according to the user identification information, the business request data and the access key, wherein the cloud service access request message includes domain name address information of the preset server; and
transmitting the cloud service access request message to the preset server, so that the preset server re-signs the cloud service access request message in case that the preset server performs signature verification on the cloud service access request message and the verification has passed, to obtain a new cloud service access request message, and transmits the new cloud service access request message to the cloud server.

In an aspect, there is provided an apparatus for transmitting a message, the apparatus being applied to a preset server which is a pre-deployed server for transmitting a message between a terminal and a cloud server, the apparatus comprising:
a first receiving module, configured to receive a cloud service access request message transmitted by the terminal, wherein the cloud service access request message includes domain name address information of the preset server;
a determining module, configured to determine a cloud service interface address to be accessed according to the cloud service access request message;
a verifying module, configured to perform signature verification on the cloud service access request message according to the cloud service interface address, and re-sign the cloud service access request message in case that the verification has passed, to obtain a new cloud service access request message; and
a first transmitting module, configured to transmit the new cloud service access request message to the cloud server according to the cloud service interface address.

In an aspect, there is provided an apparatus for transmitting a message, the apparatus being applied to a terminal, and the apparatus comprising:
an acquiring module, configured to acquire user identification information of a current user,
business request data and an access key pre-allocated for the current user by a preset server, wherein the preset server is a pre-deployed server for transmitting a message between the terminal and a cloud server;
a request message generating module, configured to generate a cloud service access request message according to the user identification information, the business request data and the access key, wherein the cloud service access request message includes domain name address information of the preset server;
a second transmitting module, configured to transmit the cloud service access request message to the preset server, so that the preset server re-signs the cloud service access request message in case that the preset server performs signature verification on the cloud service access request message and the verification has passed, to obtain a new cloud service access request message, and transmits the new cloud service access request message to the cloud server.

In an aspect, there is provided a computer-readable storage medium having a computer program stored thereon, wherein the computer program, when executed by a processing apparatus, implements the steps of the method according to the aspects of the present disclosure.

In an aspect, there is provided a electronic device, comprising: a storage apparatus, having stored at least one computer program thereon; at least one processing apparatus, configured to execute the at least one computer program in the storage apparatus, to implement the steps of the method according to the aspects of the present disclosure.

In an aspect, there is provided a computer program product comprising computer instructions, wherein the computer instructions, when executed by a processing apparatus, implement the steps of the method according to the aspects of the present disclosure.

In an aspect, there is provided a computer program, wherein the computer program, when executed by a processing apparatus, implements the steps of the method according to the aspects of the present disclosure.

Other features and advantages of the present disclosure will be illustrated in detail in the detailed description section that follows.

BRIEF DESCRIPTION OF DRAWINGS

The above and other features, advantages and aspects of the embodiments of the present disclosure will become more apparent by referring to the following detailed description when taken in conjunction with the accompanying drawings. Throughout the drawings, the same or similar reference numerals indicate the same or similar elements. It should be understood that the drawings are schematic, and the originals and elements are not necessarily drawn to scale. In the attached drawings.

DETAILED DESCRIPTION

Figure 1:
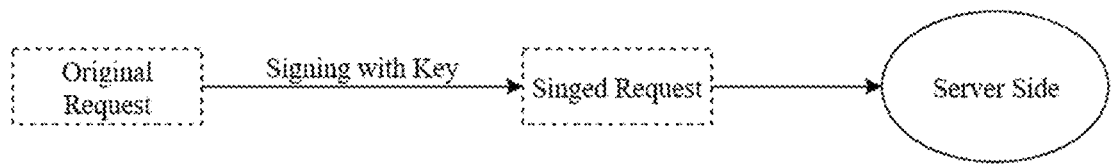
FIG. 1 is a schematic diagram of message transmission in an existing cloud service access mode.

The embodiments of the present disclosure will be described in more detail below with reference to the accompanying drawings. Although certain embodiments of the present disclosure are shown in the drawings, it should be understood that the present disclosure can be implemented in various forms and should not be construed as limited to the embodiments set forth herein, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units. Modifications of "one" and "more" mentioned in the present disclosure are schematic rather than restrictive, and those skilled in the art should understand that unless otherwise explicitly stated in the context, it should be understood as "one or more".

Names of messages or information exchanged among multiple apparatuses in the embodiments of the present disclosure are only used for illustrative purposes, and are not used to limit the scope of such messages or information.

All actions in the present disclosure to acquire signals, information or data are carried out under the premise of complying with the corresponding data protection regulations and policies of the local country and having the authorization from the corresponding apparatus's owner.

It can be understood that before using the technical solutions disclosed by various embodiments of the present disclosure, the users should be informed of the types, scope of use, scenarios of use, etc. of personal information involved in the present disclosure in an appropriate way according to relevant laws and regulations and be requested to give the authorizations.

For example, in response to receiving an active request from the user, prompt information is transmitted to the user to explicitly remind the user that the operation requested by the user to be performed will require obtaining and using the user's personal information, so that the user can autonomously choose whether to provide personal information to software or hardware such as electronic devices, applications, servers or storage media that perform the operations of the technical solutions of the present disclosure according to the prompt information.

As an optional but non-limiting implementation, the way to transmit prompt information to the user in response to receiving an active request from the user can be, for example, a pop-up window, in which the prompt information may be presented in text. In addition, the pop-up window may also carry a selection control for the user to select to "agree" or "disagree" to provide personal information to the electronic device.

It can be understood that the above process for notifying the user and obtaining the user's authorization is only schematic, and does not limit the implementation of the present disclosure. Other processes that meet the relevant laws and regulations can also be applied to the implementation of the present disclosure.

At the same time, it can be understood that the data involved in this technical solution (including but not limited to the data itself, data acquisition or use) should comply with the requirements of corresponding laws, regulations and relevant regulations.

The present disclosure is mostly applied to scenarios in which cloud service resources are accessed and used by calling APIs provided by cloud vendors. As shown in FIG. 1, when an interface is in use, it is required to use an interface access key provided by the vendor to sign the issued original request, and then the signed request is directly transmitted to the cloud server. The signing algorithm is usually open. The user can sign the cloud service access request as long as he/she acquires the key for the account, realizing the calling of the interfaces of related functions. However, since it is the interface of the cloud service vendor the user directly accesses, the administration department cannot audit and detect cloud service access requests from respective users, leading to a problem of security risks present in cloud service data access.

Figure 2:
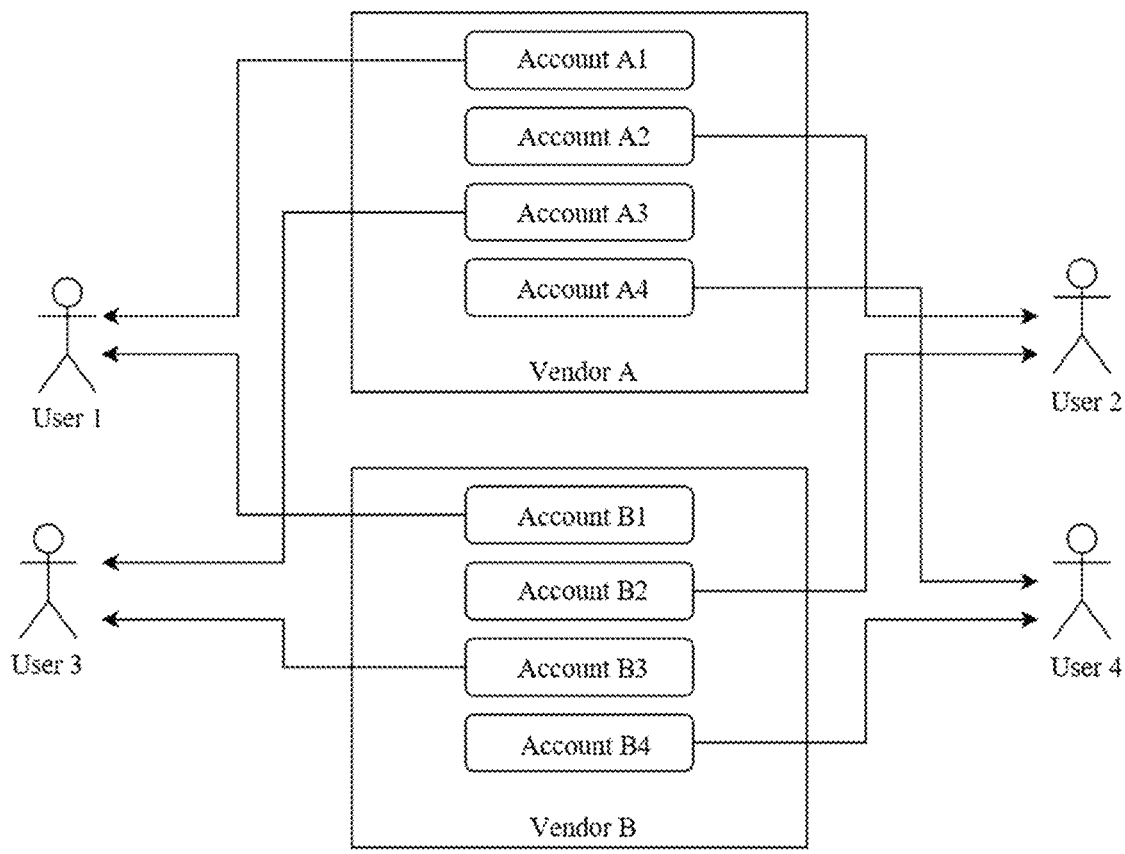
FIG. 2 is a schematic diagram of account allocation in an existing cloud service access mode.

As shown in FIG. 2, in a practical application scenario, when multiple users are using a same cloud service, in order to control permissions of resources, multiple accounts with different permissions are generally configured independently, and each of the accounts accesses the resources it needs. Moreover, if a same user needs to access cloud services provided by multiple cloud vendors, it is required to configure a different account for each of the vendors. However, an account for a vendor risks being leaked (e.g., if the user who owns the account leaves the position, or the account is lost, etc.). If a certain user's account for a cloud service vendor is leaked, it is required perform a corresponding deleting operation at management platforms of different cloud vendors. In another possible scenario, if a user's permissions for access to cloud services are to be adjusted, it is also required to log onto respective cloud vendor platforms for operation. Therefore, in the prior art, it is difficult to maintain and manage the accounts regardless of the case of account leakage or the case of permission adjustment.

In order to solve the above present problems, the present disclosure provides a method, apparatus, storage medium and electronic device for transmitting a message, in which a preset server for transmitting a message is pre-deployed between a terminal and a cloud server, an interface access address of a cloud vendor is adjusted at the terminal side (i.e., domain name address information is obtained by adding a preset domain name suffix pre-configured for the preset server to the original interface access address), and a cloud service access request message is signed with an access key provided by the preset server. Then, the cloud service access request message transmitted by the terminal can be diverted to the preset server, and the preset server can perform account verification uniformly on the users who currently want to access the cloud server, so that the administration department can audit and detect the cloud service access request message through the preset server, and can uniformly detect and manage the functions used, the frequency of use, and the like by the user, realizing the controllability of cloud service access and reducing the security risk of cloud service data access.

Through the above technical solution, the preset server for transmitting a message pre-deployed between the terminal and the cloud server may: receive a cloud service access request message transmitted by the terminal, in which the cloud service access request message includes domain name address information of the preset server; determine a cloud service interface address to be accessed according to the cloud service access request message; perform signature verification on the cloud service access request message according to the cloud service interface address, and re-sign the cloud service access request message in case that the verification has passed, to obtain a new cloud service access request message; and transmit the new cloud service access request message to the cloud server according to the cloud service interface address. As such, the cloud service access request message transmitted by the terminal can be diverted to the preset server according to the domain name address information, and the preset server can perform account verification uniformly on the users who currently want to access the cloud server, so that the administration department can audit and detect the cloud service access request message through the preset server, realizing the controllability of cloud service access and reducing the security risk of cloud service data access.

Additionally, based on the uniform detection and management performed by the preset server on the cloud service access request messages of respective users, when an account corresponding to a certain user (one account, or multiple accounts corresponding to multiple cloud vendors) is leaked, the administration department can delete the accounts of the user through the preset server without logging onto multiple cloud vendor platforms for performing deleting operations respectively, thereby greatly reducing the maintenance and management cost for accounts, and meanwhile, there is no need to separately configure an account for each of the users among the cloud vendors, and multiple users can share one real key, so that an effect of accounts being isolated can be achieved as long as one fake signed key is allocated to each of the users, without affecting other users when a single user account is leaked.

In the following, specific implementations of the present disclosure will be described in detail with reference to the accompanying drawings.

Figure 3:
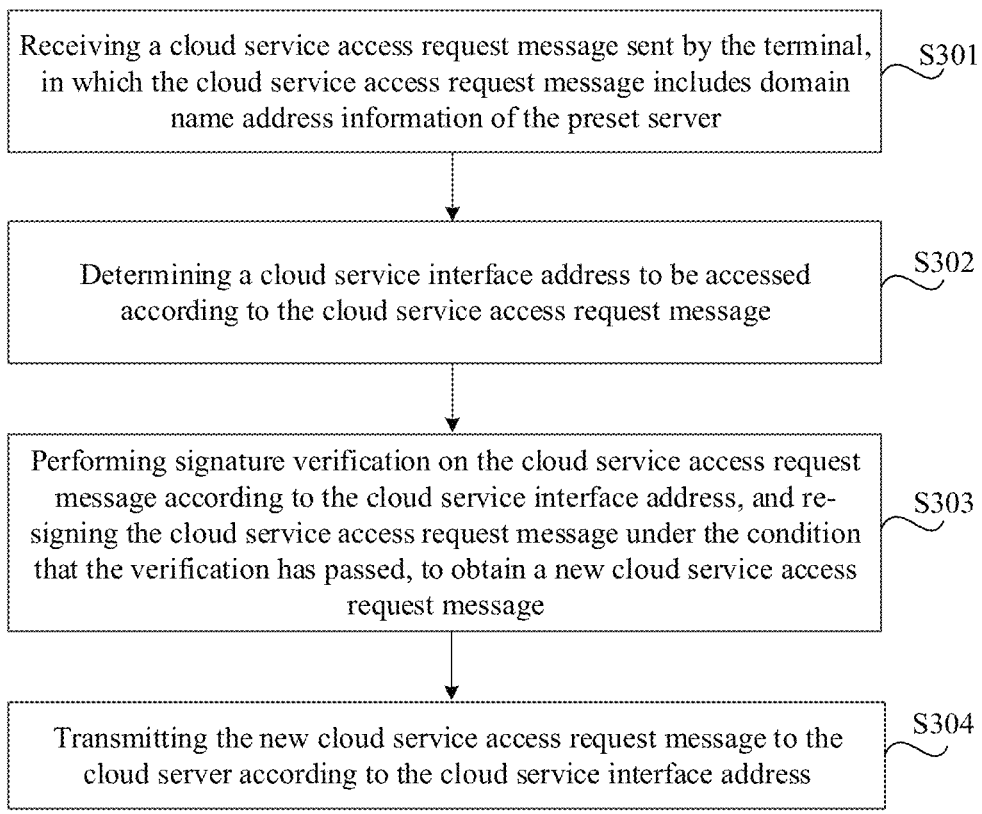
FIG. 3 is a flowchart of a method for transmitting a message according to an exemplary embodiment.

FIG. 3 is a flowchart of a method for transmitting a message according to an exemplary embodiment. The method is applied to a preset server, which is a pre-deployed server for transmitting a message between a terminal and a cloud server. The preset server can be understood as an intermediate proxy service preset between the terminal and the server. As shown in FIG. 3, the method includes the following steps:

Step S301: receiving a cloud service access request message transmitted by the terminal, in which the cloud service access request message includes domain name address information of the preset server.

The cloud service access request message includes user identification information of the current user (e.g., a developer who needs to use the cloud service resources) who wants to access the cloud service, specific business request data and domain name address information of the preset server, in which the domain name address information includes an cloud service interface address of a cloud vendor corresponding to the cloud server to be accessed by the current user and a preset domain name suffix corresponding to the preset server. By adding the preset domain name suffix subsequent to the cloud service interface address, the cloud service access request message can be diverted to the preset server, so as to facilitate the preset server to perform account verification uniformly on the users who currently want to access the cloud server, so that the administration department can audit and detect the cloud service access request message through the preset server.

Step S302: determining a cloud service interface address to be accessed according to the cloud service access request message.

In this step, a preset domain name suffix corresponding to the preset server may be acquired; the domain name address information from the cloud service access request message may be acquired; as such, the cloud service interface address may be determined from the domain name address information according to the preset domain name suffix.

As mentioned above, in order to divert the cloud service access request message to the preset server, a preset domain name suffix (i.e., the preset domain name suffix) may be pre-configured for the preset server, and afterwards, the preset domain name suffix may be added to the cloud service interface address to obtain the domain name address information, as such, in the course of determining the cloud service interface address from the domain name address information according to the preset domain name suffix, the original cloud service interface address may be restored by deleting the preset domain name suffix from the domain name address information.

Figure 4:
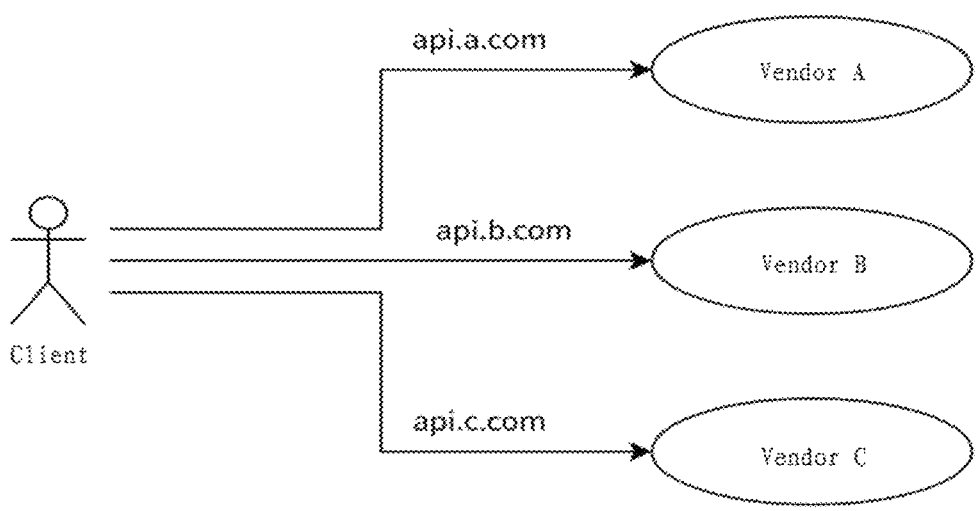
FIG. 4 is a schematic diagram of message transmission in an existing cloud service access mode.
Figure 5:
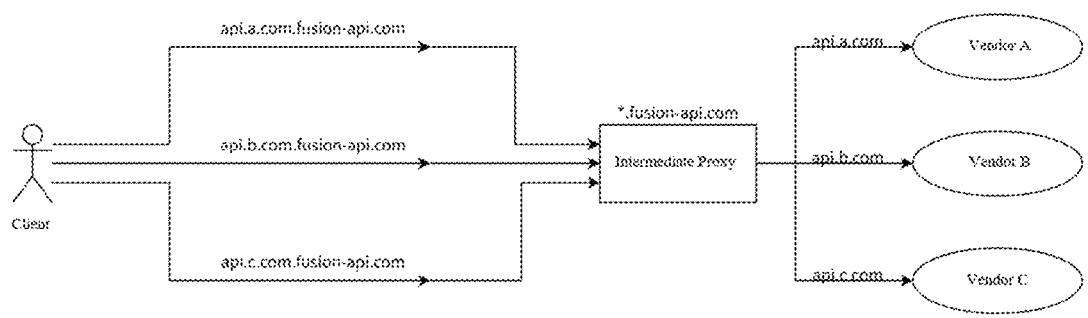
FIG. 5 is a schematic diagram of a process for transmitting a message according to an exemplary embodiment.

Exemplarily, FIG. 4 is a schematic diagram of an access mode when accessing cloud services in the prior art. In the original mode, the user may directly access interface services by using interface access addresses and keys from cloud vendors. As shown in FIG. 4, a client may directly access an interface of Vendor A by using a cloud service interface address api.a.com of Vendor A, may directly access an interface of Vendor B by using a cloud service interface address api.b.com of Vendor B, and may directly access an interface of Vendor C by using a cloud service interface address api.c.com of Vendor C. In the present disclosure, as shown in FIG. 5, in order to divert the cloud service access request message to the preset server (i.e., intermediate proxy in FIG. 5), a universal domain name *.fusion-api.com may be configured for the preset server in advance, as such, a preset domain name suffix.fusion-api.com may be added to the original cloud service interface address, accomplishing the diversion of the request. After receiving the request message, the preset server may restore the original cloud service interface address by deleting the preset domain name suffix from the domain name address information in the request message. As shown in FIG. 5, the domain name address information in the cloud service access request message to access Vendor A received by the preset server is api.a.com.fusion-api.com, and after restoring the request message, the original cloud service interface address of Vendor A is obtained as api.a.com. The above examples are only for illustration, which are not limited by the present disclosure.

In practical application scenarios, in order to control permissions for access to resources, the preset server may pre-configure different accounts (i.e., Access Key Id, AK) for different users to access different interfaces, in which the user identification information of the current user includes the AK account, and different user identification information corresponds to different cloud service interfaces. Therefore, in another possible implementation of this step, the cloud service interface address may also be determined according to the user identification information in the cloud service access request message. For example, the preset server may pre-store a correspondence between AK accounts and cloud service interfaces in a database, and after receiving the cloud service access request message, the server may read an AK account from the user identification information in the cloud service access request message, and afterwards, may acquire the cloud service interface to be accessed by the current user by means of looking up a table, so as to determine the cloud service interface address.

Step S303: performing signature verification on the cloud service access request message according to the cloud service interface address, and re-signing the cloud service access request message in case that the verification has passed, to obtain a new cloud service access request message.

The cloud service access request message includes user identification information of the current user and business request data, and the business request data includes vendor identification information of a cloud vendor corresponding to the cloud server to be accessed by the current user.

Figure 6:
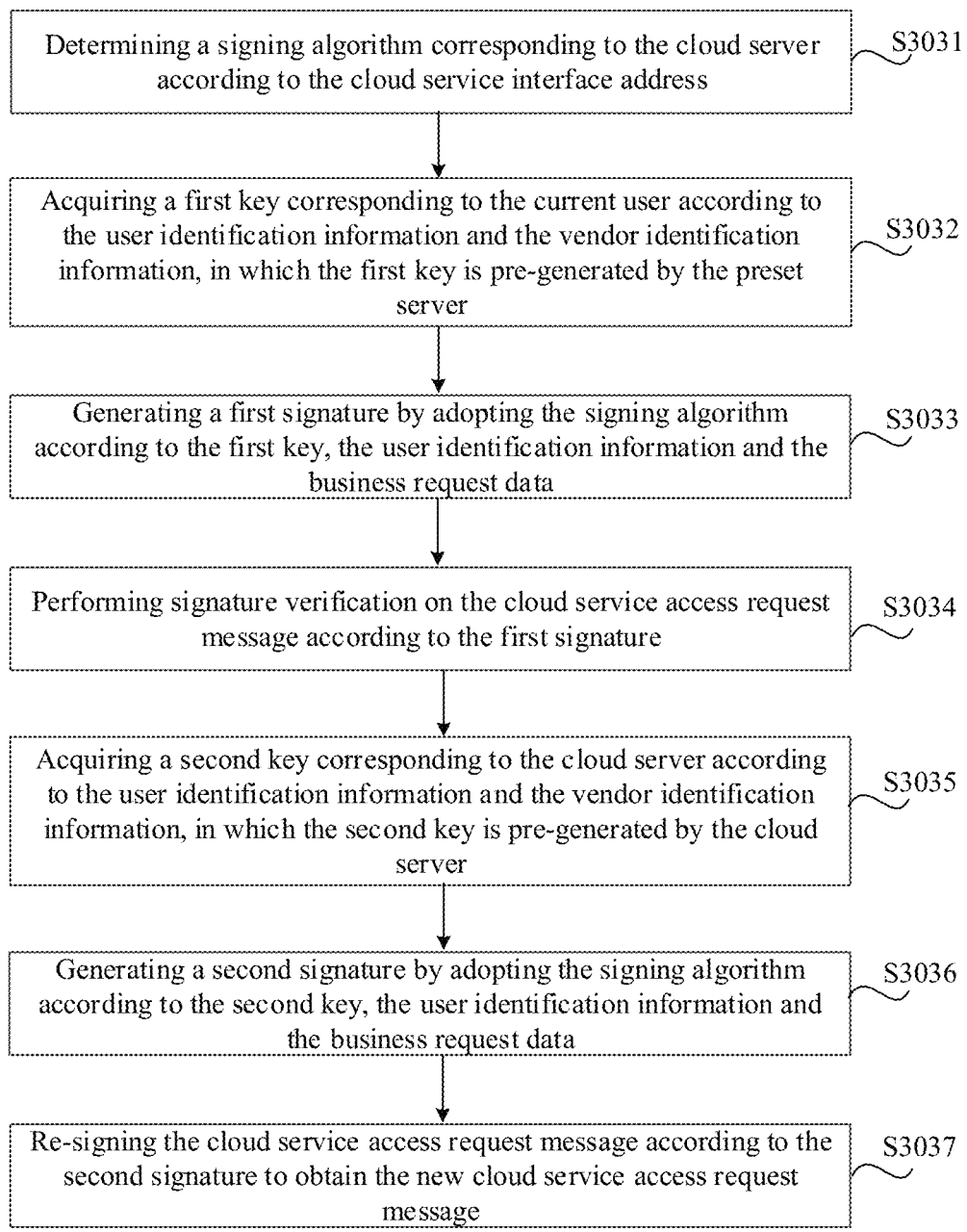
FIG. 6 is a flowchart of a method for transmitting a message according to an exemplary embodiment.

FIG. 6 is a flowchart of a method for transmitting a message according to an exemplary embodiment. As shown in FIG. 6, signature verification may be performed on the cloud service access request message according to the cloud service interface address by performing the following steps:

Step S3031: determining a signing algorithm corresponding to the cloud server according to the cloud service interface address.

In practical application scenarios, different cloud vendors correspond to different signing algorithms, and each of the cloud vendors discloses the signing algorithm to the public. In this step, a cloud vendor corresponding to the cloud server to be accessed currently may be determined according to the cloud service interface address, and in turn a signing algorithm corresponding to the cloud vendor may be determined.

Step S3032: acquiring a first key corresponding to the current user according to the user identification information and the vendor identification information, in which the first key is pre-generated by the preset server.

Compared with the real key corresponding to the cloud server, the first key can be understood as a fake key generated by the preset server for the user.

In a possible application scenario, a correspondence between users, cloud vendors and fake keys may be pre-stored in the preset server, as such, the first key may be acquired by means of looking up a table according to the user identification information and the vendor identification information in this step.

Exemplarily, Table 1 is a correspondence between user information, vendor information and corresponding key information stored in the preset server. As shown in Table 1, assuming that the current user is User u1, and User u1 wants to access the cloud service resources provided by Cloud Vendor A. In this case, the preset server may acquire User Identification Information u1 and Vendor Identification Information A from the cloud service access request message, and afterwards, may determine that the first key corresponding to User u1 and Cloud Vendor A is FakeKey1 by means of looking up Table 1. The above examples are only for illustration, which are not limited by the present disclosure.

TABLE 1

| User | Cloud Vendor | Fake key | Real Key |
|------|--------------|----------|----------|
| u1 | A | FakeKey1 | RealKey1 |
| u2 | B | FakeKey2 | RealKey2 |
| u3 | C | FakeKey3 | RealKey3 |
| u4 | D | FakeKey4 | RealKey4 |

Step S3033: generating a first signature by adopting the signing algorithm according to the first key, the user identification information and the business request data.

In this step, the first signature may be acquired by recalculating based on the signing algorithm according to the user identification information, the business request data and the first key. The specific calculating method can refer to descriptions in relevant literatures, which is not limited here.

S3034: performing signature verification on the cloud service access request message according to the first signature.

In a possible implementation, the first signature may be compared with the signature information in the cloud service access request message. If they are completely consistent, it is determined that the cloud service access request message has passed the verification. Afterwards, the key of the cloud service access request message may be replaced, and the request message signed with the real key provided by the cloud server may be transmitted to the cloud server, so as to realize the calling of the cloud server interface.

Step S3035: acquiring a second key corresponding to the cloud server according to the user identification information and the vendor identification information, in which the second key is pre-generated by the cloud server.

The second key is the real key provided by the cloud server.

In this step, the preset server may also find the corresponding second key by means of looking up a table according to the user identification information and the vendor identification information.

Exemplarily, to continue with Table 1 as an example, assuming that the current user is User u1, and User u1 wants to access the cloud service resources provided by Cloud Vendor A. In this case, the preset server may acquire User Identification Information u1 and Vendor Identification Information A from the cloud service access request message, and afterwards, may determine that a second key corresponding to User u1 and Cloud Vendor A is RealKey1 by means of looking up Table 1. The above examples are only for illustration, which are not limited by the present disclosure.

Step S3036: generating a second signature by adopting the signing algorithm according to the second key; the user identification information and the business request data.

Similarly, in this step, the second signature may be obtained by recalculating based on the signing algorithm according to the second key, the user identification information and the business request data.

Step S3037: re-signing the cloud service access request message according to the second signature to obtain the new cloud service access request message.

In a possible implementation, the original signature in the cloud service access request message may be replaced with the second signature, so as to re-sign the cloud service access request message according to the second signature to obtain the new cloud service access request message, in which the original signature is a signature generated by the terminal adopting a fake key allocated by the preset server.

Based on the steps shown in FIG. 6, the preset server can perform signature verification on a cloud service access request message transmitted by the terminal that is signed with a fake key, and can adopt, in case that the verification has passed, a real key provided by the cloud server to re-sign the cloud service access request message, as such, not only a uniform management on cloud service access accounts can be realized, but also audition and detection on cloud service access requests of respective users can be realized. For example, it can be grasped in time that which resources have been accessed by the users, which cloud service interface functions have been used, how good the quality of processing service capabilities (such as response speed) requested by the current user by the cloud vendors is, what problems have been encountered, and so on, so it can be evaluated whether the resource data used by the users is safe or not, and also the service capabilities of the cloud vendors can be evaluated.

S304: transmitting the new cloud service access request message to the cloud server according to the cloud service interface address.

With the adoption of the above method, the cloud service access request message transmitted by the terminal can be diverted to the preset server according to the domain name address information, and the preset server can perform account verification uniformly on the users who currently want to access the cloud server, so that the administration department can audit and detect the cloud service access request message through the preset server realizing the controllability of cloud service access and reducing the security risk of cloud service data access.

Additionally, based on the uniform detection and management performed by the preset server on the cloud service access request messages of respective users, when an account corresponding to a certain user (one account, or multiple accounts corresponding to multiple cloud vendors) is leaked, the administration department can delete the accounts of the user through the preset server without logging onto multiple cloud vendor platforms for performing deleting operations respectively, thereby greatly reducing the maintenance and management cost for accounts, and meanwhile, there is no need to separately configure an account for each of the users among the cloud vendors, and multiple users can share one real key, so that an effect of accounts being isolated can be achieved as long as one fake signed key is allocated to each of the users, without affecting other users when a single user account is leaked.

Figure 7:
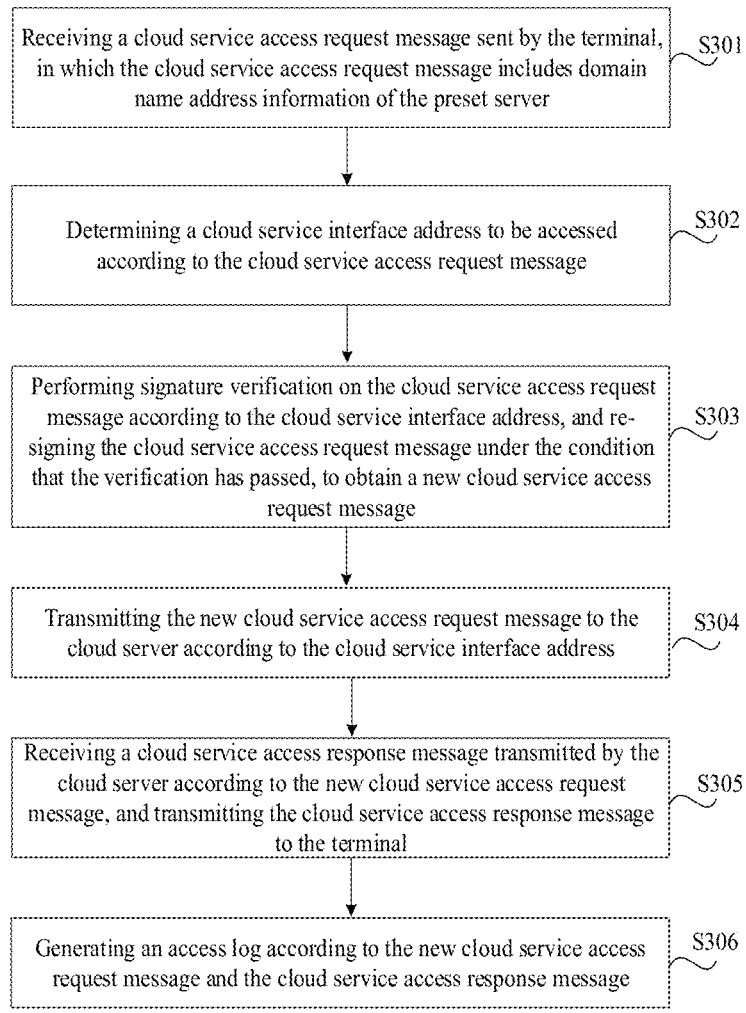
FIG. 7 is a flowchart of a method for transmitting a message according to an exemplary embodiment.

FIG. 7 is a flowchart of a method for transmitting a message according to the embodiment shown in FIG. 3. As shown in FIG. 7, the method further includes the following steps:

Step S305: receiving a cloud service access response message transmitted by the cloud server according to the new cloud service access request message, and transmitting the cloud service access response message to the terminal.

The cloud service access response message may include business response information. The preset server may receive the cloud service access response message returned by the cloud server after transmitting the re-signed new cloud service access request message to the cloud server, and afterwards, may transmit the cloud service access response message to the terminal.

As shown in FIG. 7, the method further includes the following steps:

S306: generating an access log according to the new cloud service access request message and the cloud service access response message.

The access log is used for recording cloud service access items of the current user. The cloud service access items include items such as target resources accessed by the current user, target interface functions used by the current user, quality of processing service capabilities (such as response speed) for the current user request of the cloud vendors, whether a problem has been encountered with the current access and what the encountered problem is, evaluation of whether resource data used by the current user is safe or not, and so on.

In this step, the access log may be generated according to the new cloud service access request message, the cloud service access response message, the transmitting time of the request message, the receiving time of the response message, and the like, realizing audition and detection on the cloud service access request of the current user.

Figure 8:
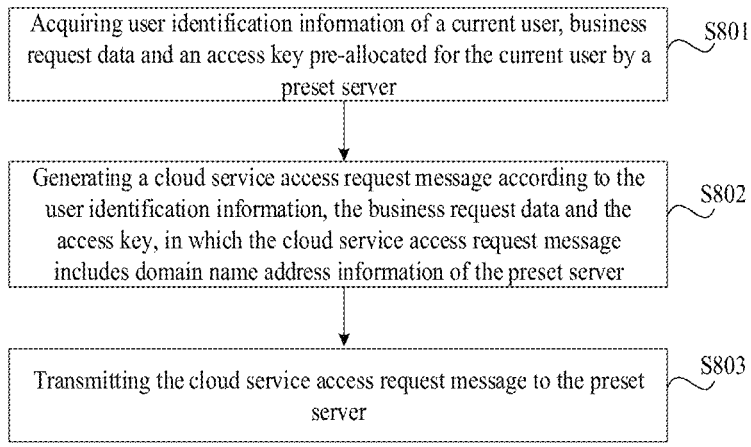
FIG. 8 is a flowchart of a method for transmitting a message according to an exemplary embodiment.

FIG. 8 is a flowchart of a method for transmitting a message according to an exemplary embodiment. The method can be applied to a terminal. As shown in FIG. 8, the method includes the following steps:

S801: acquiring user identification information of a current user, business request data and an access key pre-allocated for the current user by a preset server.

The business request data may include information such as vendor identification information of a cloud vendor corresponding to a cloud server to be accessed by the current user, actual service access parameters, and so on. The preset server is a pre-deployed server for transmitting a message between the terminal and the cloud server. The preset server can be understood as a preset intermediate proxy service between the terminal and the server. Compared with the real key allocated for the user by the cloud server in the original cloud service access mode, the access key refers to a fake key pre-allocated for the user by the preset server.

Step S802: generating a cloud service access request message according to the user identification information, the business request data and the access key, in which the cloud service access request message includes domain name address information of the preset server.

In this step, a cloud service interface address of the cloud server may be acquired according to the vendor identification information in the business request data; the domain name address information may be generated according to the cloud service interface address and the preset domain name suffix corresponding to the preset server; a third signature may be generated by adopting a signing algorithm provided by the cloud server according to the access key, the user identification information and the business request data; and the cloud service access request message may be generated according to the third signature, the user identification information, the business request data and the domain name address information.

In the present disclosure, in order to perform detection and management uniformly on the cloud service access request transmitted by the user through the preset server, it is required to divert the cloud service access request message to the preset server. In a possible implementation, a universal domain name may be pre-configured for the preset server, and the terminal may adjust the cloud service interface address for each of the cloud vendors according to the universal domain name. For example, the cloud service interface address of Vendor A is api.a.com, subsequent to which a preset domain name suffix .fusion-api.com may be added to generate the domain name address information. As such, the terminal may transmit the cloud service access request message to the preset server according to the domain name address information, thereby realizing the diversion of the request message.

It should be noted that a correspondence between preset domain name suffixes and preset server IP addresses may be preset, so as to guarantee that the messages transmitted to an address corresponding to the preset domain name suffix can be diverted to the preset server.

After the domain name address information is generated, the third signature may be calculated by adopting the signing algorithm provided by the cloud server according to the access key, the user identification information and the business request data. The specific process for generating the third signature can refer to descriptions in relevant literatures, which is not limited here. After the third signature is generated, the cloud service access request message may be generated according to the third signature, the user identification information, the business request data and the domain name address information.

Step S803: transmitting the cloud service access request message to the preset server.

As such, in case that the preset server performs signature verification on the cloud service access request message and the verification has passed, the preset server may re-sign the cloud service access request message, to obtain a new cloud service access request message, and transmits the new cloud service access request message to the cloud server.

With the adoption of the above method, the terminal can transmit the cloud service access request message transmitted by the terminal to the preset server by adjusting the cloud service interface address of the cloud vendor, that is, adding the preset domain name suffix corresponding to the preset server subsequent to the cloud service interface address, and the preset server can perform account verification uniformly on the users who currently want to access the cloud server, so that the administration department can audit and detect the cloud service access request message through the preset server, realizing the controllability of cloud service access and reducing the security risk of cloud service data access.

Additionally, based on the uniform detection and management performed by the preset server on the cloud service access request messages of respective users, when an account corresponding to a certain user (one account, or multiple accounts corresponding to multiple cloud vendors) is leaked, the administration department can delete the accounts of the user through the preset server without logging onto multiple cloud vendor platforms for performing deleting operations respectively, thereby greatly reducing the maintenance and management cost for accounts, and meanwhile, there is no need to separately configure an account for each of the users among the cloud vendors, and multiple users can share one real key, so that an effect of accounts being isolated can be achieved as long as one fake signed key is allocated to each of the users, without affecting other users when a single user account is leaked.

Figure 9:
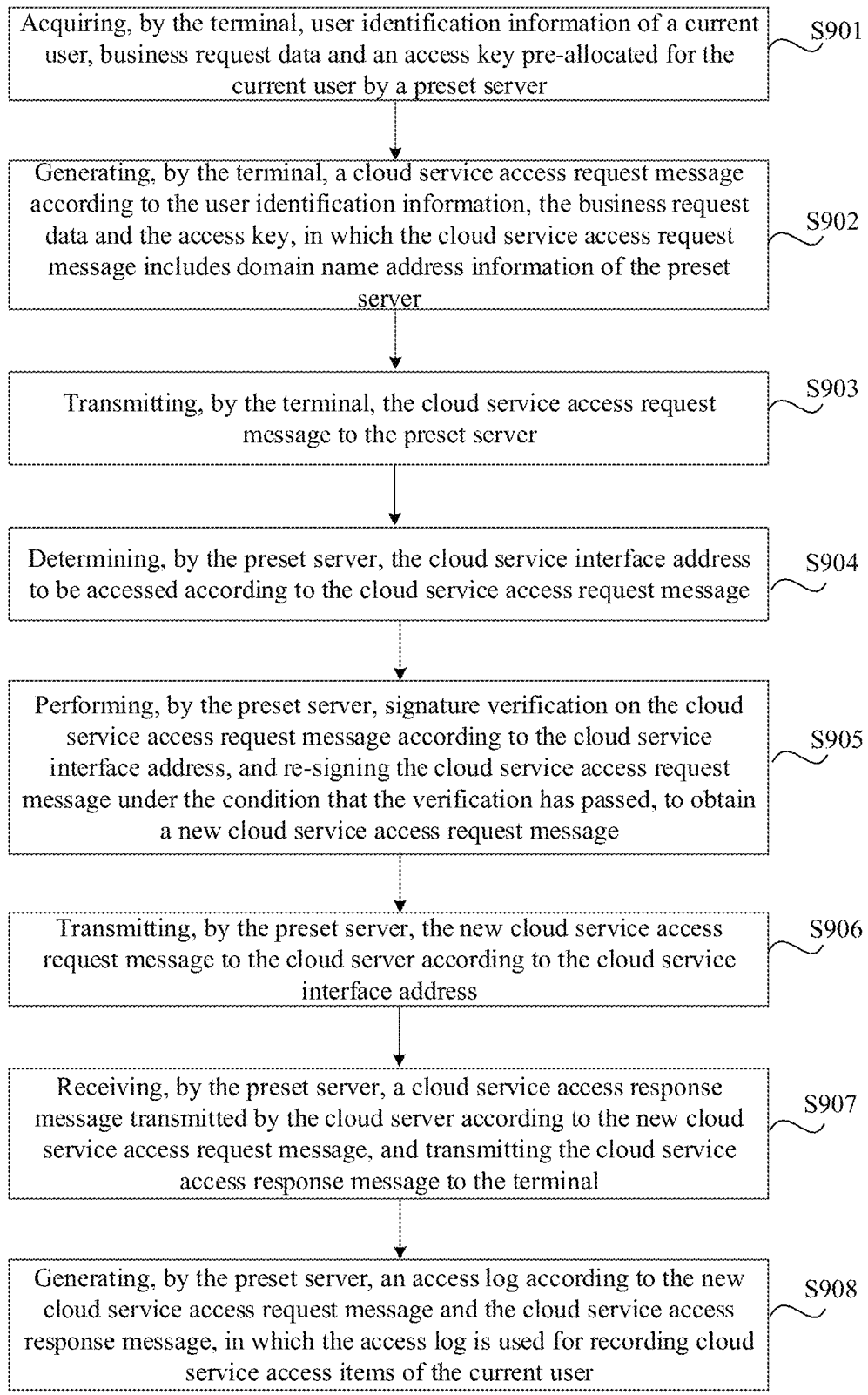
FIG. 9 is a flowchart of a method for transmitting a message according to an exemplary embodiment.

FIG. 9 is a flowchart of a method for transmitting a message according to an exemplary embodiment. As shown in FIG. 9, the method includes the following steps:

S901: acquiring, by the terminal, user identification information of a current user, business request data and an access key pre-allocated for the current user by a preset server.

The current user generally refers to the developer who needs to use cloud service resources at the current moment. The business request data may include information such as vendor identification information of a cloud vendor corresponding to the cloud server to be accessed by the current user, actual service access parameters, and so on. The preset server is a pre-deployed server for transmitting a message between the terminal and the cloud server. The preset server can be understood as a preset intermediate proxy service between the terminal and the server. Compared with the real key allocated for the user by the cloud server in the original cloud service access mode, the access key refers to a fake key pre-allocated for the user by the preset server.

Step S902: generating, by the terminal, a cloud service access request message according to the user identification information, the business request data and the access key, in which the cloud service access request message includes domain name address information of the preset server.

The business request data includes vendor identification information of a cloud vendor corresponding to the cloud server to be accessed by the current user. In this step, the terminal may: acquire a cloud service interface address of the cloud server according to the vendor identification information; generate domain name address information according to the cloud service interface address and a preset domain name suffix corresponding to the preset server; generate a third signature by adopting a signing algorithm provided by the cloud server according to the access key, the user identification information and the business request data; and generate the cloud service access request message according to the third signature, the user identification information, the business request data and the domain name address information.

In the present disclosure, in order to perform detection and management uniformly on the cloud service access request transmitted by the user through the preset server, it is required to divert the cloud service access request message to the preset server. In a possible implementation, a universal domain name may be pre-configured for the preset server, and the terminal may adjust the cloud service interface address for each of the cloud vendors according to the universal domain name. For example, the cloud service interface address of Vendor A is api.a.com, subsequent to which a preset domain name suffix .fusion-api.com may be added to generate the domain name address information. As such, the terminal may transmit the cloud service access request message to the preset server according to the domain name address information, thereby realizing the diversion of the request message.

It should be noted that a correspondence between preset domain name suffixes and preset server IP addresses may be preset, so as to guarantee that the messages transmitted to an address corresponding to the preset domain name suffix can be diverted to the preset server.

S903: transmitting, by the terminal, the cloud service access request message to the preset server.

S904: determining, by the preset server, the cloud service interface address to be accessed according to the cloud service access request message.

In this step, the preset domain name suffix corresponding to the preset server may be acquired, the domain name address information may be acquired from the cloud service access request message, and the cloud service interface address may be determined from the domain name address information according to the preset domain name suffix. The specific examples can refer to descriptions in the embodiments corresponding to FIG. 3, which will not be detailed here.

In another possible implementation, different user identification information may correspond to different cloud service interfaces. Therefore, in this step, the cloud service interface address may also be determined according to the user identification information in the cloud service access request message. For example, the preset server may pre-store a correspondence between AK accounts and cloud service interfaces in a database, and after receiving the cloud service access request message, the server may read an AK account from the user identification information in the cloud service access request message, and afterwards, may acquire the cloud service interface to be accessed by the current user by means of looking up a table, so as to determine the cloud service interface address.

Step S905: performing, by the preset server, signature verification on the cloud service access request message according to the cloud service interface address, and re-signing the cloud service access request message in case that the verification has passed, to obtain a new cloud service access request message.

The cloud service access request message includes user identification information of the current user and business request data, and the business request data includes vendor identification information of a cloud vendor corresponding to the cloud server to be accessed by the current user.

In this step, a signing algorithm corresponding to the cloud server may be determined according to the cloud service interface address; a first key corresponding to the current user may be acquired according to the user identification information and the vendor identification information, in which the first key is pre-generated by the preset server; a first signature may be generated by adopting the signing algorithm according to the first key, the user identification information and the business request data; and signature verification may be performed on the cloud service access request message according to the first signature.

Afterwards, a second key corresponding to the cloud server may be acquired according to the user identification information and the vendor identification information, in which the second key is pre-generated by the cloud server; a second signature may be generated by adopting the signing algorithm according to the second key; the user identification information and the business request data; the cloud service access request message may be re-signed according to the second signature to obtain the new cloud service access request message.

Compared with the real key corresponding to the cloud server, the first key can be understood as a fake key generated by the preset server for the user, and the second key is the real key provided by the cloud server.

The specific implementation of this step can refer to relevant descriptions in the embodiments corresponding to FIG. 6, which will not be detailed here.

S906: transmitting, by the preset server, the new cloud service access request message to the cloud server according to the cloud service interface address.

S907: receiving, by the preset server, a cloud service access response message transmitted by the cloud server according to the new cloud service access request message, and transmitting the cloud service access response message to the terminal.

The cloud service access response message may include business response information. The preset server may receive the cloud service access response message returned by the cloud server after transmitting the re-signed new cloud service access request message to the cloud server, and afterwards, may transmit the cloud service access response message to the terminal.

S908: generating, by the preset server, an access log according to the new cloud service access request message and the cloud service access response message, in which the access log is used for recording cloud service access items of the current user.

The access log is used for recording cloud service access items of the current user. The cloud service access items include items such as target resources accessed by the current user, target interface functions used by the current user, quality of processing service capabilities (such as response speed) for the current user request of the cloud vendors, whether a problem has been encountered with the current access and what the encountered problem is, evaluation of whether resource data used by the current user is safe or not, and so on.

In this step, the access log may be generated according to the new cloud service access request message, the cloud service access response message, the transmitting time of the request message, the receiving time of the response message, and the like, realizing audition and detection on the cloud service access request of the current user.

Figure 10:
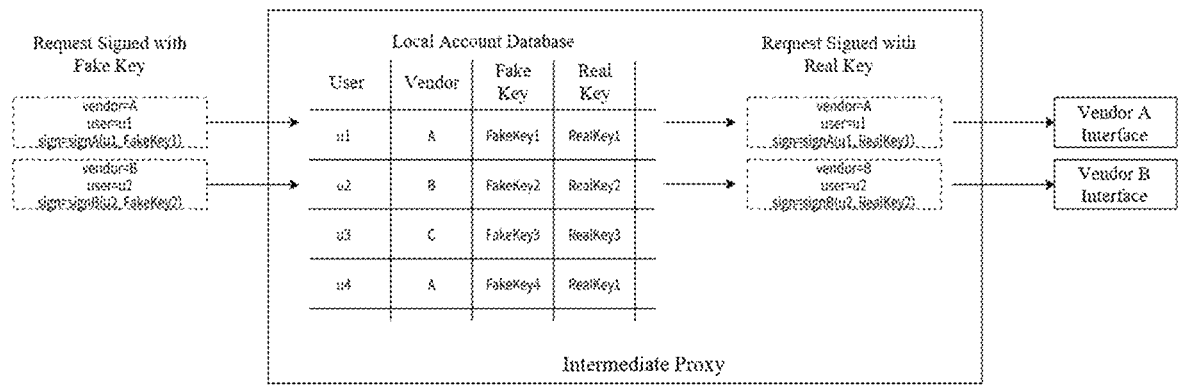
FIG. 10 is a schematic diagram of a process for transmitting a message according to an exemplary embodiment.

Exemplarily, FIG. 10 is a schematic diagram of a process for transmitting a message between a terminal, a preset server (i.e., intermediate proxy in FIG. 10) and a cloud server according to an exemplary embodiment. The terminal side first signs the original cloud service access request message with a fake key (i.e., first key) allocated by the preset server. As shown in FIG. 10, User u1 wants to access the cloud service provided by Vendor A. The cloud service access request message obtained by signing the request message at the terminal side based on the fake key allocated by the preset server is "vendor=A, user=u1, sign=signA (u1, FakeKey1)", and the terminal transmits the cloud service access request message to the preset server. The preset server acquires the fake key corresponding to User U1 and Vendor A as fakekey1 by means of looking up Table 1, and after the signature is regenerated based on the fake key FakeKey1 and the signing algorithm provided by Vendor A, performs signature verification on the request message "vendor=A, user=u1, sign=signA (u1, FakeKey1)". After the verification has passed, the real key RealKey1 allocated for User u1 by Vendor A is acquired by continuing looking up Table 1 according to User u1 and Vendor A. Then, after the signature is regenerated by adopting the signing algorithm provided by Vendor A according to the real key RealKey1 and key replacement is performed on the request message, the new cloud service access request message is obtained as "vendor=A, user=u1, sign=signA (u1, RealKey1)". Then, the preset server transmits the new cloud service access request message to the cloud server corresponding to Vendor A, realizing the access to the cloud service resources provided by Vendor A. The above examples are only for illustration, which are not limited by the present disclosure.

With the adoption of the above method, the cloud service access request message transmitted by the terminal can be diverted to the preset server according to the domain name address information in the cloud service access request message, and the preset server can perform account verification uniformly on the users who currently want to access the cloud server, so that the administration department can audit and detect the cloud service access request message through the preset server, realizing the controllability of cloud service access and reducing the security risk of cloud service data access.

Based on the uniform detection and management performed by the preset server on the cloud service access request messages of respective users, when an account corresponding to a certain user (one account, or multiple accounts corresponding to multiple cloud vendors) is leaked, the administration department can delete the accounts of the user through the preset server without logging onto multiple cloud vendor platforms for performing deleting operations respectively, thereby greatly reducing the maintenance and management cost for accounts, and meanwhile, there is no need to separately configure an account for each of the users among the cloud vendors, and multiple users can share one real key, so that an effect of accounts being isolated can be achieved as long as one fake signed key is allocated to each of the users, without affecting other users when a single user account is leaked.

Additionally, based on the above cloud service access mode, the user can continue to use the original vendor interface specification and Software Development Kit (SDK), as long as a preset domain name suffix corresponding to the preset server is added, in the SDK at the terminal side, subsequent to the interface access address of the cloud vendor to be accessed. In this way, it is more convenient for the user to use, and the functional interface of the existing cloud vendor can be directly supported, with strong universality and low implementation cost.

In order to solve the problem that in the prior art, when the cloud service resources are accessed and used by calling an API provided by the cloud vendor, since it is the interface of the cloud service vendor the user directly accesses, the administration department cannot audit and detect cloud service access requests from respective users, leading to security risks present in cloud service data access, the present disclosure can also interface all users' cloud service access requests uniformly to a gateway service by means of developing a uniform gateway.

In a possible implementation, the terminal may transmit a first request message to a gateway, in which the first request message is used for requesting to acquire cloud service resource information from the gateway. The terminal may sign the first request message with a key provided by the gateway and a signing algorithm provided by the gateway. After receiving the first request message, the gateway performs signature verification on the first request message, and in case that the verification has passed, may re-sign the first request message with a key by the cloud vendor and a signing algorithm provided by the cloud vendor to obtain a second request message, and then transmit the second request message to the cloud server.

By means of uniformly interfacing to a gateway service, the administration department can also audit and detect the user's cloud service access request through the gateway service, realizing the controllability of cloud service access and reducing the security risk of cloud service data access. Meanwhile, when an account corresponding to a certain user (one account, or multiple accounts corresponding to multiple cloud vendors) is leaked, the administration department can also delete the user's accounts through the gateway service, without logging onto multiple cloud vendor platforms for performing deleting operations respectively, thereby reducing the maintenance and management cost for accounts. Additionally, there is no need to separately configure an account for each of the users among the cloud vendors, and multiple users can share one real key, so that an effect of accounts being isolated can be achieved as long as one fake signed key is allocated to each of the users, without affecting other users when a single user account is leaked.

It should be noted that the users use the gateway service, by which the interfaces of the cloud vendors is called. In the course of pre-configuring a uniform gateway, it is required to adapt every interface of each of the cloud vendors. However, each of the cloud vendors has multiple products, each of which corresponds to dozens of open interfaces, that is, each of the vendors may generally have thousands of interfaces, and the uniform gateway requires to encapsulate the thousands of interfaces corresponding to the vendor, leading to a high development cost. In terms of different cloud vendors, the corresponding interface specifications are different. If one interface is used at the gateway side to hide the interface functions corresponding to all the cloud vendors, the development cost will also increase. Moreover, with such uniform gateway, the SDKs and documents of the cloud vendors are no longer available, which requires additional learning costs for the users.

In order to solve the problem that in the prior art, when the cloud service resources are accessed and used by calling an API provided by the cloud vendor, since it is the interface of the cloud service vendor the user directly accesses, the administration department cannot audit and detect cloud service access requests from respective users, leading to security risks present in cloud service data access, the present disclosure can also access the cloud service resources by means of customized SDK. Specifically, a uniform audit code can be added to the SDKs of different cloud vendors at the terminal side, realizing acquisition of accounts and audition of access requests.

Figure 11:
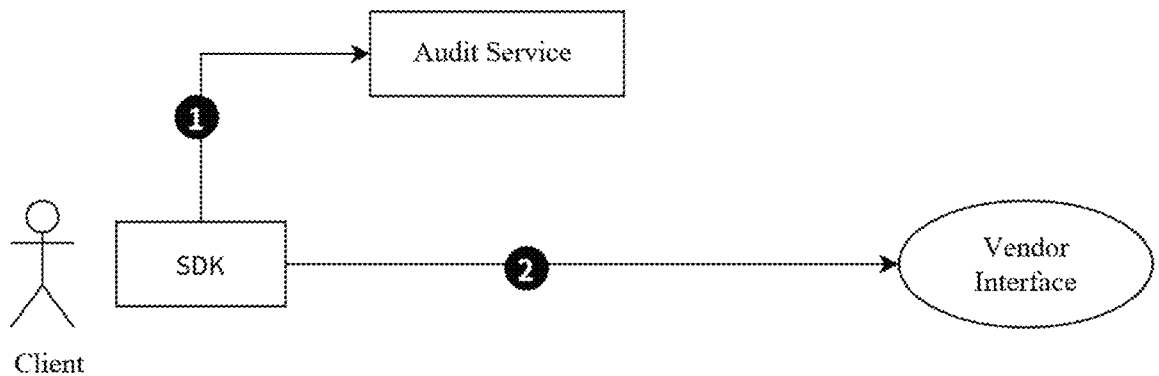
FIG. 11 is a schematic diagram of message transmission based on customized SDK.

FIG. 11 is a schematic diagram of a message transmission process for cloud service access based on customized SDK according to an exemplary embodiment. As shown in FIG. 11, the terminal may transmit a third request message to an audit server (i.e., step 1 shown in FIG. 11), in which the third request message is used for requesting to acquire a vendor account corresponding to the cloud server to be accessed and requesting to audit the cloud service access request. After receiving the third request message, the audit service may audit the cloud service access request, and may also perform signature verification on the third request message. In case that the verification has passed, the vendor account corresponding to the cloud server to be accessed by the current user may be transmitted to the terminal. Afterwards, the terminal may sign the access request message with the vendor account and key information transmitted by the audit service and transmit it to the cloud server (i.e., step 2 shown in FIG. 11).

Therefore, by means of customized SDK, the administration department can also audit and detect the user's cloud service access request through the audit service, realizing the controllability of cloud service access and reducing the security risk of cloud service data access. Meanwhile, when an account corresponding to a certain user (one account, or multiple accounts corresponding to multiple cloud vendors) is leaked, the administration department can also delete the user's accounts through the audit service without logging onto multiple cloud vendor platforms for performing deleting operations respectively; thereby reducing the maintenance and management cost for accounts.

It should be noted that, by means of customized SDK, since the users may use SDKs in different programming languages, adopting this solution requires to transform the SDKs in every language of each of the cloud vendors, which will also increase the development cost.

Figure 12:
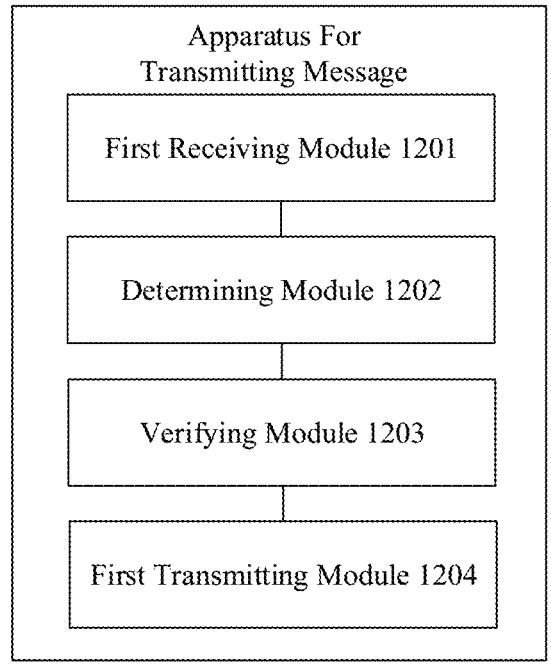
FIG. 12 is a block diagram of an apparatus for transmitting a message according to an exemplary embodiment.

FIG. 12 is a block diagram illustrating an apparatus for transmitting a message according to an exemplary embodiment. The apparatus is applied to a preset server which is a pre-deployed server for transmitting a message between a terminal and a cloud server. As shown in FIG. 12, the apparatus includes:

a first receiving module 1201, configured to receive a cloud service access request message transmitted by the terminal, in which the cloud service access request message includes domain name address information of the preset server;

a determining module 1202, configured to determine a cloud service interface address to be accessed according to the cloud service access request message;

a verifying module 1203, configured to perform signature verification on the cloud service access request message according to the cloud service interface address, and re-sign the cloud service access request message in case that the verification has passed, to obtain a new cloud service access request message;

a first transmitting module 1204, configured to transmit the new cloud service access request message to the cloud server according to the cloud service interface address.

Optionally, the determining module 1202 is configured to: acquire a preset domain name suffix corresponding to the preset server; acquire the domain name address information from the cloud service access request message; and determine the cloud service interface address from the domain name address information according to the preset domain name suffix.

Optionally, the cloud service access request message includes user identification information of the current user and business request data, and the business request data includes vendor identification information of a cloud vendor corresponding to the cloud server to be accessed by the current user, the verifying module 1203 is configured to determine a signing algorithm corresponding to the cloud server according to the cloud service interface address; acquire a first key corresponding to the current user according to the user identification information and the vendor identification information, in which the first key is pre-generated by the preset server; generate a first signature by adopting the signing algorithm according to the first key, the user identification information and the business request data; and perform signature verification on the cloud service access request message according to the first signature.

Optionally, the verifying module 1203 is configured to: acquire a second key corresponding to the cloud server according to the user identification information and the vendor identification information, in which the second key is pre-generated by the cloud server; generate a second signature by adopting the signing algorithm according to the second key; the user identification information and the business request data; and re-sign the cloud service access request message according to the second signature to obtain the new cloud service access request message.

Figure 13:
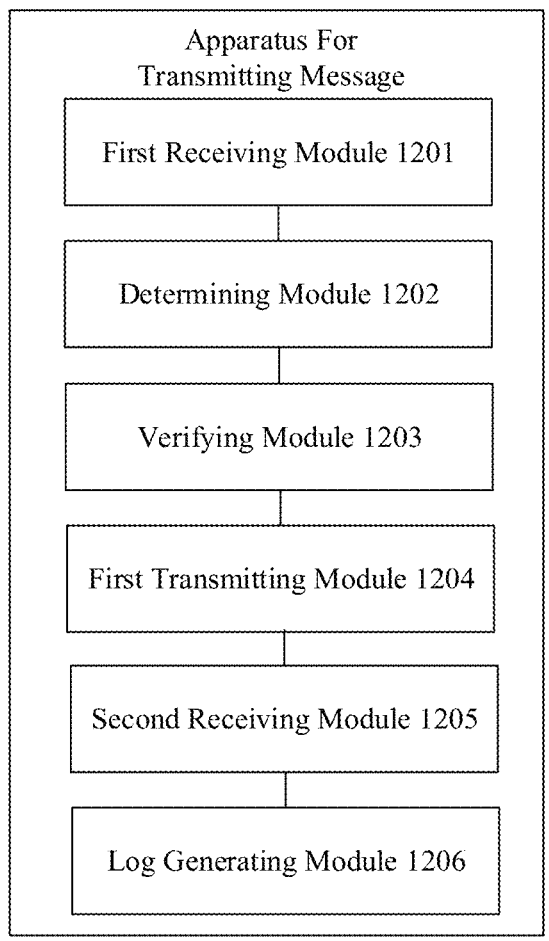
FIG. 13 is a block diagram of an apparatus for transmitting a message according to an exemplary embodiment.

Optionally, FIG. 13 is a block diagram of an apparatus for transmitting a message according to the embodiment shown in FIG. 12. As shown in FIG. 13, the apparatus further includes:

a second receiving module 1205, configured to receive a cloud service access response message transmitted by the cloud server according to the new cloud service access request message, and transmit the cloud service access response message to the terminal.

Optionally, as shown in FIG. 13, the apparatus further includes:

a log generating module 1206, configured to generate an access log according to the new cloud service access request message and the cloud service access response message, in which the access log is used for recording cloud service access items of the current user.

With the adoption of the above apparatus, the cloud service access request message transmitted by the terminal can be diverted to the preset server, and the preset server can perform account verification uniformly on the users who currently want to access the cloud server, so that the administration department can audit and detect the cloud service access request message through the preset server, realizing the controllability of cloud service access and reducing the security risk of cloud service data access.

Additionally, based on the uniform detection and management performed by the preset server on the cloud service access request messages of respective users, when an account corresponding to a certain user (one account, or multiple accounts corresponding to multiple cloud vendors) is leaked, the administration department can delete the accounts of the user through the preset server without logging onto multiple cloud vendor platforms for performing deleting operations respectively, thereby greatly reducing the maintenance and management cost for accounts, and meanwhile, there is no need to separately configure an account for each of the users among the cloud vendors, and multiple users can share one real key, so that an effect of accounts being isolated can be achieved as long as one fake signed key is allocated to each of the users, without affecting other users when a single user account is leaked.

Figure 14:
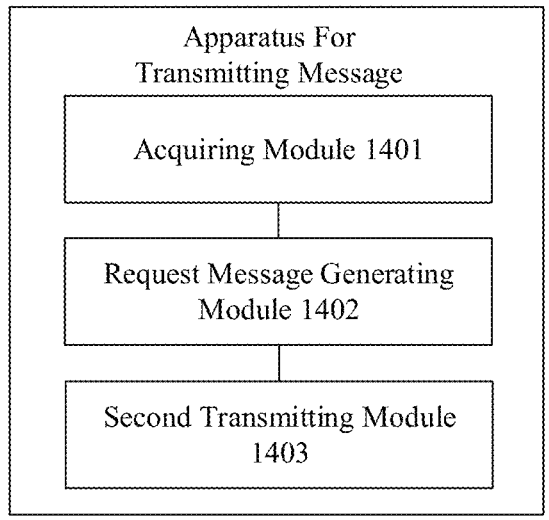
FIG. 14 is a block diagram of an apparatus for transmitting a message according to an exemplary embodiment.

FIG. 14 is a block diagram of an apparatus for transmitting a message according to an exemplary embodiment. The apparatus is applied to a terminal. As shown in FIG. 14, the apparatus includes:

an acquiring module 1401, configured to acquire user identification information of a current user, business request data and an access key pre-allocated for the current user by a preset server, in which the preset server is a pre-deployed server for transmitting a message between the terminal and a cloud server;

a request message generating module 1402, configured to generate a cloud service access request message according to the user identification information, the business request data and the access key, in which the cloud service access request message includes domain name address information of the preset server;

a second transmitting module 1403, configured to transmit the cloud service access request message to the preset server, so that the preset server performs signature verification on the cloud service access request message, re-signs the cloud service access request message in case that the verification has passed to obtain a new cloud service access request message, and transmits the new cloud service access request message to the cloud server.

Optionally, the business request data includes vendor identification information of a cloud vendor corresponding to the cloud server to be accessed by the current user, the request message generating module 1402 is configured to: acquire a cloud service interface address of the cloud server according to the vendor identification information: generate the domain name address information according to the cloud service interface address and a preset domain name suffix corresponding to the preset server; generate a third signature by adopting a signing algorithm provided by the cloud server according to the access key, the user identification information and the business request data; and generate the cloud service access request message according to the third signature, the user identification information, the business request data and the domain name address information.

With the adoption of the above apparatus, the terminal can transmit the cloud service access request message transmitted by the terminal to the preset server by adjusting the cloud service interface address of the cloud vendor, that is, adding the preset domain name suffix corresponding to the preset server subsequent to the cloud service interface address, and the preset server can perform account verification uniformly on the users who currently want to access the cloud server, so that the administration department can audit and detect the cloud service access request message through the preset server, realizing the controllability of cloud service access and reducing the security risk of cloud service data access.

Additionally, based on the uniform detection and management performed by the preset server on the cloud service access request messages of respective users, when an account corresponding to a certain user (one account, or multiple accounts corresponding to multiple cloud vendors) is leaked, the administration department can delete the accounts of the user through the preset server without logging onto multiple cloud vendor platforms for performing deleting operations respectively, thereby greatly reducing the maintenance and management cost for accounts, and meanwhile, there is no need to separately configure an account for each of the users among the cloud vendors, and multiple users can share one real key, so that an effect of accounts being isolated can be achieved as long as one fake signed key is allocated to each of the users, without affecting other users when a single user account is leaked.

Figure 15:
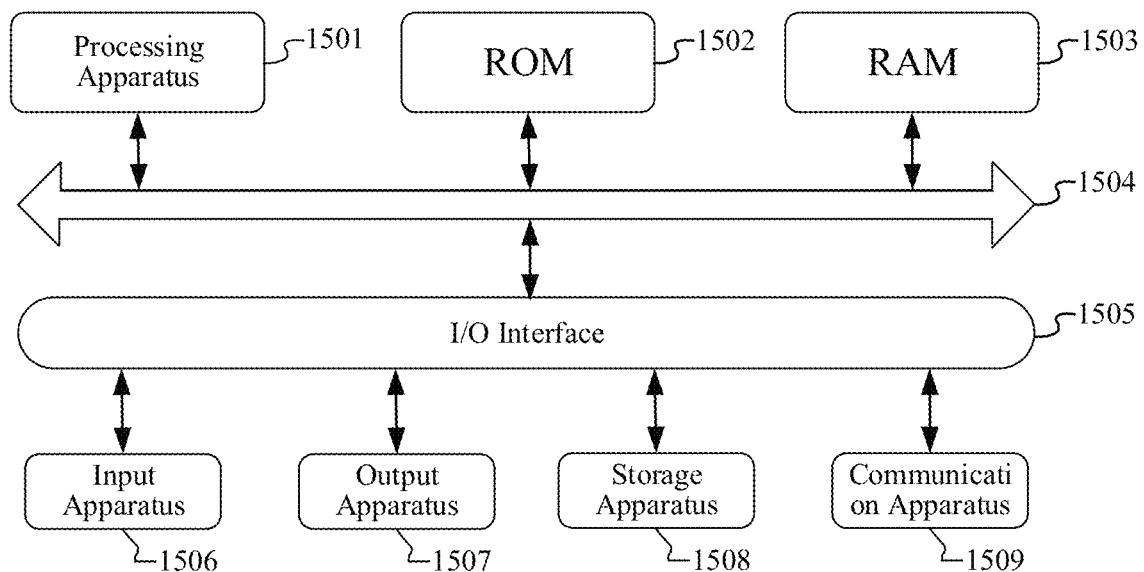
FIG. 15 is a structural block diagram of an electronic device according to an exemplary embodiment.

Referring to FIG. 15, FIG. 15 illustrates a schematic structural diagram of an electronic device 1500 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 15 is merely an example, and should not pose any limitation to the functions and the range of use of the embodiments of the present disclosure.

As illustrated in FIG. 15, the electronic device 1500 may include a processing apparatus 1501 (e.g., a central processing unit, a graphics processing unit, etc.), which can perform various suitable actions and processing according to a program stored in a read-only memory (ROM) 1502 or a program loaded from a storage apparatus 1508 into a random-access memory (RAM) 1503. The RAM 1503 further stores various programs and data required for operations of the electronic device 500. The processing apparatus 1501, the ROM 1502, and the RAM 1503 are interconnected by means of a bus 1504. An input/output (I/O) interface 1505 is also connected to the bus 1504.

Usually, the following apparatus may be connected to the I/O interface 1505: an input apparatus 1506 including, for example, a touch screen, a touch pad, a keyboard, a mouse, a camera, a microphone, an accelerometer, a gyroscope, or the like; an output apparatus 1507 including, for example, a liquid crystal display (LCD), a loudspeaker, a vibrator, or the like; a storage apparatus 1508 including, for example, a magnetic tape, a hard disk, or the like; and a communication apparatus 1509. The communication apparatus 509 may allow the electronic device 1500 to be in wireless or wired communication with other devices to exchange data. While FIG. 15 illustrates the electronic device 1500 having various apparatuses, it should be understood that not all of the illustrated apparatuses are necessarily implemented or included. More or fewer apparatuses may be implemented or included alternatively.

Particularly, according to embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 1509 and installed, or may be installed from the storage apparatus 1508, or may be installed from the ROM 1502. When the computer program is executed by the processing apparatus 1501, the above-mentioned functions defined in the methods of some embodiments of the present disclosure are performed.

The embodiments of the present disclosure also provides a computer program which is stored in a readable storage medium, and one or more processors of an electronic device can read the computer program from the readable storage medium, and the one or more processors execute the computer program, so that the electronic device performs the solution provided by any of the above embodiments.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the internet (e.g., Internet), and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: receive a cloud service access request message transmitted by the terminal; determine a cloud service interface address to be accessed according to the cloud service access request message; perform signature verification on the cloud service access request message according to the cloud service interface address, and re-sign the cloud service access request message in case that the verification has passed, to obtain a new cloud service access request message; and transmit the new cloud service access request message to the cloud server according to the cloud service interface address.

Alternatively, the above-mentioned computer-readable medium carries one or more programs, and when the one or more programs are executed by the electronic device, the electronic device is caused to: acquire user identification information of a current user, business request data and an access key pre-allocated for the current user by a preset server, wherein the preset server is a pre-deployed server for transmitting a message between the terminal and a cloud server; generate a cloud service access request message according to the user identification information, the business request data and the access key; and transmit the cloud service access request message to the preset server, so that the preset server re-signs the cloud service access request message in case that the preset server performs signature verification on the cloud service access request message and the verification has passed, to obtain a new cloud service access request message, and transmits the new cloud service access request message to the cloud server.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases. For example, a first receiving module may also be described as "a module for receiving a request message".

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a tangible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive. RAM. ROM. EPROM (or a flash memory), an optical fiber. CD-ROM, an optical storage device, a magnetic storage device, or any suitable combinations of the above.

According to one or more embodiments of the present disclosure. Example 1 provides a method for transmitting a message, the method being applied to a preset server which is a pre-deployed server for transmitting a message between a terminal and a cloud server, the method comprising: receiving a cloud service access request message transmitted by the terminal, wherein the cloud service access request message includes domain name address information of the preset server; determining a cloud service interface address to be accessed according to the cloud service access request message; performing signature verification on the cloud service access request message according to the cloud service interface address, and re-signing the cloud service access request message in case that the verification has passed, to obtain a new cloud service access request message; and transmitting the new cloud service access request message to the cloud server according to the cloud service interface address.

According to one or more embodiments of the present disclosure, Example 2 provides the method of Example 1, the determining the cloud service interface address to be accessed according to the domain name address information comprises: acquiring a preset domain name suffix corresponding to the preset server; acquiring the domain name address information from the cloud service access request message; and determining the cloud service interface address from the domain name address information according to the preset domain name suffix.

According to one or more embodiments of the present disclosure, Example 3 provides the method of Example 1, the cloud service access request message includes user identification information of the current user and business request data, and the business request data includes vendor identification information of a cloud vendor corresponding to the cloud server to be accessed by the current user, the performing signature verification on the cloud service access request message according to the cloud service interface address comprises: determining a signing algorithm corresponding to the cloud server according to the cloud service interface address; acquiring a first key corresponding to the current user according to the user identification information and the vendor identification information, wherein the first key is pre-generated by the preset server; generating a first signature by adopting the signing algorithm according to the first key, the user identification information and the business request data; and performing signature verification on the cloud service access request message according to the first signature.

According to one or more embodiments of the present disclosure, Example 4 provides the method of Example 3, the re-signing the cloud service access request message to obtain the new cloud service access request message comprises: acquiring a second key corresponding to the cloud server according to the user identification information and the vendor identification information, wherein the second key is pre-generated by the cloud server; generating a second signature by adopting the signing algorithm according to the second key, the user identification information and the business request data; and re-signing the cloud service access request message according to the second signature to obtain the new cloud service access request message.

According to one or more embodiments of the present disclosure, Example 5 provides the method of any of Examples 1-4, wherein the method further comprises: receiving a cloud service access response message transmitted by the cloud server according to the new cloud service access request message, and transmitting the cloud service access response message to the terminal.

According to one or more embodiments of the present disclosure, Example 6 provides the method of Example 5, after receiving the cloud service access response message transmitted by the cloud server according to the new cloud service access request message, the method further comprises: generating an access log according to the new cloud service access request message and the cloud service access response message, wherein the access log is used for recording cloud service access items of the current user.

According to one or more embodiments of the present disclosure. Example 7 provides a method for transmitting a message, the method being applied to a terminal, and the method comprising: acquiring user identification information of a current user, business request data and an access key pre-allocated for the current user by a preset server, wherein the preset server is a pre-deployed server for transmitting a message between the terminal and a cloud server; generating a cloud service access request message according to the user identification information, the business request data and the access key, wherein the cloud service access request message includes domain name address information of the preset server; and transmitting the cloud service access request message to the preset server, so that the preset server re-signs the cloud service access request message in case that the preset server performs signature verification on the cloud service access request message and the verification has passed, to obtain a new cloud service access request message, and transmits the new cloud service access request message to the cloud server.

According to one or more embodiments of the present disclosure, Example 8 provides the method of Example 7, wherein the business request data includes vendor identification information of a cloud vendor corresponding to the cloud server to be accessed by the current user, the generating the cloud service access request message according to the user identification information, the business request data and the access key comprises: acquiring a cloud service interface address of the cloud server according to the vendor identification information; generating the domain name address information according to the cloud service interface address and a preset domain name suffix corresponding to the preset server; generating a third signature by adopting a signing algorithm provided by the cloud server according to the access key, the user identification information and the business request data; and generating the cloud service access request message according to the third signature, the user identification information, the business request data and the domain name address information.

According to one or more embodiments of the present disclosure. Example 9 provides an apparatus for transmitting a message, the apparatus being applied to a preset server which is a pre-deployed server for transmitting a message between a terminal and a cloud server, the apparatus comprising: a first receiving module, configured to receive a cloud service access request message transmitted by the terminal, wherein the cloud service access request message includes domain name address information of the preset server; a determining module, configured to determine a cloud service interface address to be accessed according to the cloud service access request message; a verifying module, configured to perform signature verification on the cloud service access request message according to the cloud service interface address, and re-sign the cloud service access request message in case that the verification has passed, to obtain a new cloud service access request message; and a first transmitting module, configured to transmit the new cloud service access request message to the cloud server according to the cloud service interface address.

According to one or more embodiments of the present disclosure, Example 10 provides the apparatus of Example 9. The determining module is configured to: acquire a preset domain name suffix corresponding to the preset server; acquire the domain name address information from the cloud service access request message; and determine the cloud service interface address from the domain name address information according to the preset domain name suffix.

According to one or more embodiments of the present disclosure, Example 11 provides the apparatus of Example 9. The cloud service access request message includes user identification information of the current user and business request data, and the business request data includes vendor identification information of a cloud vendor corresponding to the cloud server to be accessed by the current user. The verifying module is configured to determine a signing algorithm corresponding to the cloud server according to the cloud service interface address; acquire a first key corresponding to the current user according to the user identification information and the vendor identification information, in which the first key is pre-generated by the preset server; generate a first signature by adopting the signing algorithm according to the first key, the user identification information and the business request data; and perform signature verification on the cloud service access request message according to the first signature.

According to one or more embodiments of the present disclosure, Example 12 provides the apparatus of Example 11. The verifying module is configured to: acquire a second key corresponding to the cloud server according to the user identification information and the vendor identification information, in which the second key is pre-generated by the cloud server; generate a second signature by adopting the signing algorithm according to the second key, the user identification information and the business request data; and re-sign the cloud service access request message according to the second signature to obtain the new cloud service access request message.

According to one or more embodiments of the present disclosure, Example 13 provides the apparatus of any of Examples 9-12, the apparatus further includes: a second receiving module, configured to receive a cloud service access response message transmitted by the cloud server according to the new cloud service access request message, and transmit the cloud service access response message to the terminal.

According to one or more embodiments of the present disclosure, Example 14 provides the apparatus of Example 13. The apparatus further includes: a log generating module, configured to generate an access log according to the new cloud service access request message and the cloud service access response message, in which the access log is used for recording cloud service access items of the current user.

According to one or more embodiments of the present disclosure, Example 15 provides an apparatus for transmitting a message, the apparatus being applied to a terminal, and the apparatus comprising:
  an acquiring module, configured to acquire user identification information of a current user, business request data and an access key pre-allocated for the current user by a preset server, wherein the preset server is a pre-deployed server for transmitting a message between the terminal and a cloud server;
  a request message generating module, configured to generate a cloud service access request message according to the user identification information, the business request data and the access key, wherein the cloud service access request message includes domain name address information of the preset server;
  a second transmitting module, configured to transmit the cloud service access request message to the preset server, so that the preset server re-signs the cloud service access request message in case that the preset server performs signature verification on the cloud service access request message and the verification has passed, to obtain a new cloud service access request message, and transmits the new cloud service access request message to the cloud server.

According to one or more embodiments of the present disclosure. Example 16 provides the apparatus of Example 15. The business request data includes vendor identification information of a cloud vendor corresponding to the cloud server to be accessed by the current user. The request message generating module is configured to: acquire a cloud service interface address of the cloud server according to the vendor identification information: generate the domain name address information according to the cloud service interface address and a preset domain name suffix corresponding to the preset server; generate a third signature by adopting a signing algorithm provided by the cloud server according to the access key, the user identification information and the business request data; and generate the cloud service access request message according to the third signature, the user identification information, the business request data and the domain name address information.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A method for transmitting a message, the method being applied to a preset server which is a pre-deployed server for transmitting a message between a terminal and a cloud server, the method comprising:
   receiving a cloud service access request message transmitted by the terminal, wherein the cloud service access request message comprises domain name address information of the preset server;
   determining a cloud service interface address to be accessed according to the cloud service access request message;
   performing signature verification on the cloud service access request message according to the cloud service interface address, and re-signing the cloud service access request message in case that the verification has passed, to obtain a new cloud service access request message; and
   transmitting the new cloud service access request message to the cloud server according to the cloud service interface address,
   wherein the cloud service access request message comprises user identification information of the current user and business request data, and the business request data comprises vendor identification information of a cloud vendor corresponding to the cloud server to be accessed by the current user, the performing signature verification on the cloud service access request message according to the cloud service interface address comprises:
      determining a signing algorithm corresponding to the cloud server according to the cloud service interface address;
      acquiring a first key corresponding to the current user according to the user identification information and the vendor identification information, wherein the first key is pre-generated by the preset server;
      generating a first signature by adopting the signing algorithm according to the first key, the user identification information and the business request data; and
      performing signature verification on the cloud service access request message according to the first signature;
   wherein the re-signing the cloud service access request message to obtain the new cloud service access request message comprises:
      acquiring a second key corresponding to the cloud server according to the user identification information and the vendor identification information, wherein the second key is pre-generated by the cloud server;
      generating a second signature by adopting the signing algorithm according to the second key, the user identification information and the business request data; and
      re-signing the cloud service access request message according to the second signature to obtain the new cloud service access request message.

2. The method of claim 1, wherein the determining the cloud service interface address to be accessed according to the cloud service access request message comprises:
   acquiring a preset domain name suffix corresponding to the preset server;
   acquiring the domain name address information from the cloud service access request message; and
   determining the cloud service interface address from the domain name address information according to the preset domain name suffix.

3. The method of claim 2, wherein the method further comprises:
   receiving a cloud service access response message transmitted by the cloud server according to the new cloud service access request message, and transmitting the cloud service access response message to the terminal.

4. The method of claim 1, wherein the method further comprises:
   receiving a cloud service access response message transmitted by the cloud server according to the new cloud service access request message, and transmitting the cloud service access response message to the terminal.

5. The method of claim 4, wherein after receiving the cloud service access response message transmitted by the cloud server according to the new cloud service access request message, the method further comprises:
  generating an access log according to the new cloud service access request message and the cloud service access response message, wherein the access log is used for recording cloud service access items of the current user.

6. An electronic device, comprising:
a storage apparatus, having stored at least one computer program thereon; and
at least one processing apparatus, configured to execute the at least one computer program in the storage apparatus, to perform a method, wherein the method comprises:
  receiving a cloud service access request message transmitted by the terminal, wherein the cloud service access request message comprises domain name address information of the preset server;
  determining a cloud service interface address to be accessed according to the cloud service access request message;
  performing signature verification on the cloud service access request message according to the cloud service interface address, and re-signing the cloud service access request message in case that the verification has passed, to obtain a new cloud service access request message; and
  transmitting the new cloud service access request message to the cloud server according to the cloud service interface address,
  wherein the cloud service access request message comprises user identification information of the current user and business request data, and the business request data comprises vendor identification information of a cloud vendor corresponding to the cloud server to be accessed by the current user, the performing signature verification on the cloud service access request message according to the cloud service interface address comprises:
    determining a signing algorithm corresponding to the cloud server according to the cloud service interface address;
    acquiring a first key corresponding to the current user according to the user identification information and the vendor identification information, wherein the first key is pre-generated by the preset server;
    generating a first signature by adopting the signing algorithm according to the first key, the user identification information and the business request data; and
    performing signature verification on the cloud service access request message according to the first signature;
  wherein the re-signing the cloud service access request message to obtain the new cloud service access request message comprises:
    acquiring a second key corresponding to the cloud server according to the user identification information and the vendor identification information, wherein the second key is pre-generated by the cloud server;
    generating a second signature by adopting the signing algorithm according to the second key, the user identification information and the business request data; and
    re-signing the cloud service access request message according to the second signature to obtain the new cloud service access request message.

7. The electronic device of claim 6, wherein the determining the cloud service interface address to be accessed according to the cloud service access request message comprises:
  acquiring a preset domain name suffix corresponding to the preset server;
  acquiring the domain name address information from the cloud service access request message; and
  determining the cloud service interface address from the domain name address information according to the preset domain name suffix.

8. The electronic device of claim 6, wherein the method further comprises:
  receiving a cloud service access response message transmitted by the cloud server according to the new cloud service access request message, and transmitting the cloud service access response message to the terminal.

9. A non-transient computer-readable storage medium having a computer program stored thereon, wherein the computer program, upon being executed by a processing apparatus, implements the method according to claim 1.

* * * * *